(12) United States Patent
Desai et al.

(10) Patent No.: US 11,743,065 B2
(45) Date of Patent: Aug. 29, 2023

(54) ELECTRONIC DEVICE THAT VISUALLY MONITORS HAND AND MOUTH MOVEMENTS CAPTURED BY A MUTED DEVICE OF A REMOTE PARTICIPANT IN A VIDEO COMMUNICATION SESSION

(71) Applicant: MOTOROLA MOBILITY LLC, Wilmington, DE (US)

(72) Inventors: Rahul B Desai, Hoffman Estates, IL (US); Amit Kumar Agrawal, Bangalore (IN); Olivier D Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/346,428

(22) Filed: Jun. 14, 2021

(65) Prior Publication Data

US 2022/0400022 A1 Dec. 15, 2022

(51) Int. Cl.
*H04L 12/18* (2006.01)
*G06K 9/00* (2022.01)
*G06V 40/20* (2022.01)
*G06V 40/10* (2022.01)

(52) U.S. Cl.
CPC ........ *H04L 12/1822* (2013.01); *G06V 40/107* (2022.01); *G06V 40/28* (2022.01); *H04L 12/1818* (2013.01)

(58) Field of Classification Search
CPC . H04L 12/1822; H04L 12/1818; G06V 40/28; G06V 40/107
See application file for complete search history.

(56) References Cited

U.S. PATENT DOCUMENTS

| | | | | |
|---|---|---|---|---|
| 7,532,714 B1 * | 5/2009 | Miller | ...................... | H04N 7/15 379/202.01 |
| 7,617,457 B2 * | 11/2009 | Kortum | ................... | H04M 3/56 715/755 |
| 8,515,137 B2 * | 8/2013 | Richards | ................... | G06T 7/97 382/284 |
| 9,071,692 B2 * | 6/2015 | Sanaullah | ............. | H04M 3/563 |
| 9,516,268 B2 * | 12/2016 | Heda | ..................... | H04N 7/147 |
| 9,893,902 B2 * | 2/2018 | Vander Mey | ......... | H04M 3/566 |
| 11,082,465 B1 | 8/2021 | Chavez | | |
| 11,082,661 B1 | 8/2021 | Pollefeys | | |
| 2001/0054070 A1 | 12/2001 | Savage, III | | |

(Continued)

*Primary Examiner* — Nazia Naoreen
(74) *Attorney, Agent, or Firm* — Isidore PLLC

(57) ABSTRACT

An electronic device, computer program product, and method mitigates loss of communication between participants in a communication session when a remote participant attempts to speak without manually unmuting the electronic device. A controller configures the electronic device to monitor one or more image streams originating respectively at one or more second electronic devices during a video communication session. The controller identifies, in a particular image stream of the one or more image streams, at least one of a speaking movement of a mouth of a particular participant or a gesture by the particular participant to present an audio input via the video communication session. A user interface presented on at least one user interface device of the electronic device presents an alert that the particular participant is attempting to speak to other participants in the video communication session.

19 Claims, 9 Drawing Sheets

(56) References Cited

U.S. PATENT DOCUMENTS

| | | | |
|---|---|---|---|
| 2006/0244818 A1* | 11/2006 | Majors | H04N 21/4788 |
| | | | 348/E7.083 |
| 2014/0022332 A1 | 1/2014 | Wang | |
| 2014/0071223 A1 | 3/2014 | Chatterjee et al. | |
| 2014/0085404 A1* | 3/2014 | Kleinsteiber | H04N 7/15 |
| | | | 348/E7.083 |
| 2014/0320584 A1 | 10/2014 | Kumar | |
| 2014/0379351 A1* | 12/2014 | Raniwala | G06V 40/20 |
| | | | 704/270 |
| 2016/0094355 A1* | 3/2016 | Waltermann | H04L 12/1822 |
| | | | 715/755 |
| 2016/0104094 A1 | 4/2016 | Yom-Tov | |
| 2016/0255126 A1* | 9/2016 | Sarris | H04L 65/1096 |
| | | | 348/14.08 |
| 2016/0381720 A1 | 12/2016 | Baek | |
| 2018/0358034 A1* | 12/2018 | Chakra | G10L 25/78 |
| 2018/0376108 A1* | 12/2018 | Bright-Thomas | G06V 20/40 |
| 2020/0110572 A1 | 4/2020 | Lenke | |
| 2020/0178045 A1 | 6/2020 | Sung | |
| 2021/0005098 A1* | 1/2021 | Davis | G06Q 10/06393 |
| 2021/0014074 A1* | 1/2021 | Dhawan | H04L 65/403 |
| 2021/0014455 A1 | 1/2021 | Gorny | |
| 2021/0201935 A1 | 7/2021 | Seethaler | |
| 2022/0191257 A1* | 6/2022 | Aceron | G06F 3/04842 |
| 2022/0308825 A1* | 9/2022 | Tosh | H04N 7/15 |

\* cited by examiner

ELECTRONIC DEVICE THAT VISUALLY MONITORS HAND AND MOUTH MOVEMENTS CAPTURED BY A MUTED DEVICE OF A REMOTE PARTICIPANT IN A VIDEO COMMUNICATION SESSION

BACKGROUND

1. Technical Field

The present disclosure relates generally to electronic devices that support/enable video communication sessions using a camera and a microphone, and more particularly to electronic devices that support/enable video communication sessions with microphones that can be muted and unmuted during the communication session.

2. Description of the Related Art

User communication devices such as mobile phones, desktop workstations, laptops, and tablets are often equipped with a front side camera and a microphone to enable online human communication. For privacy and other reasons, a local participant can turn off the front side camera. To avoid unintentional interruptions to other participants due to ambient noise, feedback, etc., the local participant can mute the microphone. Although muting has benefits, the muted microphone results in a degradation to the user experience when the local participant does seek to speak to the other participants but fails/forgets to unmute the microphone. When the camera of the local participant is turned off, the other participants may not even know that the local participant wants to speak or has started speaking. Even if the camera is on, other participants may not have the image stream of the local participant presented on their respective second electronic device. The appropriate time during the communication session for the remote participant to speak may be irrecoverably missed. For example, the current speaker or presenter may pause or expressly ask if there are any questions. When the remote participant's attempt to speak is not noticed by the other participants, the speaker or presenter moves on without ever hearing or being aware of the attempt by the remote participant to speak.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
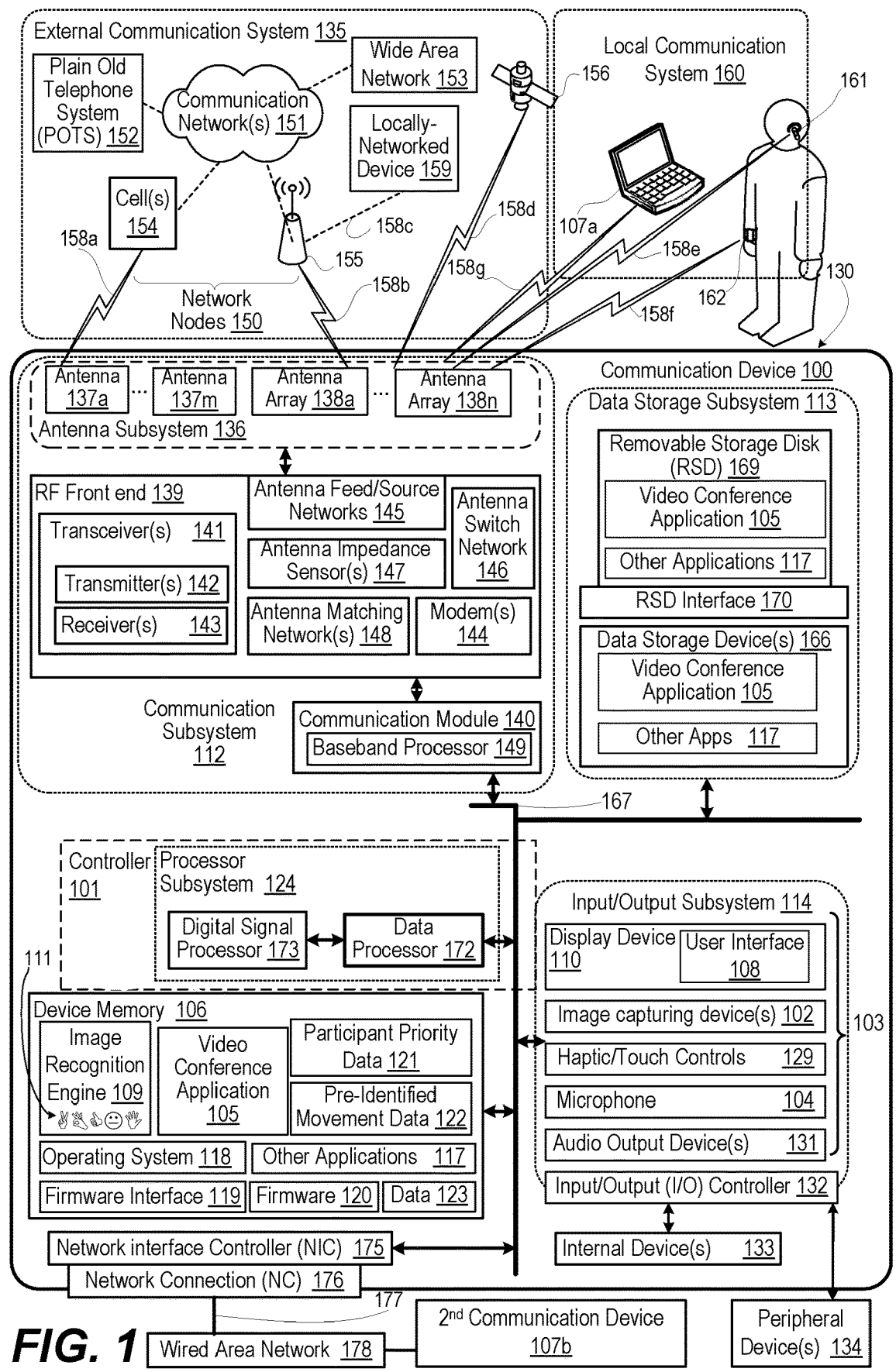
FIG. 1 depicts a functional block diagram of a communication environment of a communication device that reduces loss of communication between participants in a communication session when a remote participant attempts to speak without manually unmuting a microphone of the communication device, and within which the features of the present disclosure are advantageously implemented, according to one or more embodiments.

In one or more aspects of the present disclosure, an electronic device, computer program product, and method reduces loss of verbal communication between participants in a communication session when a remote participant attempts to speak without manually unmuting a muted microphone of the remote electronic device. The electronic device includes a network interface device that enables the electronic device to communicatively communicate in a video communication session with at least one second electronic device. A controller configures the electronic device to receive and monitor one or more image streams originating respectively at the one or more second electronic devices during a video communication session. The controller identifies, in a particular image stream of the one or more image streams, at least one of a speaking movement of a mouth of a particular participant or a gesture by the particular participant to present an audio input via the video communication session. A user interface presented on at least one user interface device of the electronic device can present an alert that the particular participant is attempting to speak to other participants in the video communication session. The controller can also transmit an alert to the second electronic device used by the particular participant, the alert indicating the second electronic device is muted.

The features of the present disclosure are implemented within an environment that allows participants to mute their electronic device for privacy or to avoid ambient noises from disturbing other participants, and the disclosure then allows host or presenter facilitation of the participants resumption of speaking in instances where the participant forgets to first unmute their electronic device. In an example, a remote participant can have their electronic device in a locally muted state when the remote participant decides to begin speaking or attempts to speak. In one embodiment, the electronic device can regulate which of the participants can speak to avoid having multiple participants speaking at the same time. In situations where multiple speakers begin speaking at or around the same time, the disclosure provides additional notifications associated with an order in which the participants are permitted to speak.

According to aspects of the present disclosure, the electronic device improves a video communication session by automatically detecting situations in which certain participants perform or present certain gestures or movements of the mouth that visually indicate an attempt by that participant to speak. In particular, the electronic device detects movements of the hands or mouth of the participant that indicate an attempt by the participant to speak, and the attempt can be visually indicated to a presenter within the user interface of the video communication session. The disclosure addresses situations in which the presenter may not be viewing or paying attention to, or be unable to view, the particular image stream from the participant attempting to speak. In such scenarios, the present disclosure enables the controller of the host device, presenter device, or communications server to monitor the incoming image stream for information indicating when a muted participant is attempting to speak and to unobtrusively handle these situations from the perspective of the current presenter.

In one or more embodiments, the electronic device only monitors for movements by remote participants that are using a muted second electronic device. The muting can be a "hard muting" that is done at the second electronic device that prevents audio input from the remote participant from being transmitted to the electronic device. In one or more alternate embodiments, the muting can be "soft muting" in that a host or presenter participant can prevent the audio input from the remote participant from being selected as an audio output presented to others in the video communication session.

In one or more embodiments, the electronic device can monitor for movement by remote participants that are using second electronic devices that are either muted or unmuted. With these embodiments, remote participants who are knowledgeable of the mute/unmute gestures or are aware of the remote tracking of the movement of participants' mouth can more intuitively request the opportunity to speak by performing the particular movement/gesture. The expanded monitoring scheme presented addresses inadvertently muted second electronic devices, and also allows remote participants to use the motion-based triggers to alert the presenting participant in a more hands-free manner of the remote participant's desire to speak. By silently mouthing words or making a gesture, the remote participant can trigger an alert for the presenting participant that does not insert an audio disruption into the video communication session. These movement-based controls also allow remote participants to use second electronic devices with limited user interfaces. The movement-based controls also assist remote participants with physical limitations in using a user interface. Conventional video communication systems require the participant to manually trigger a control on a user interface to unmute or to send a "raise hand" indication. By having a visually triggered indication, a participant can more intuitively speak or gesture to trigger an automatic alert to the presenting participant even with limited vision or limited use of the hands. One or more types of alerts can be triggered on a user interface of the electronic device used by a presenting participant such as: (i) the image stream of the particular participant attempting to speak; (ii) a raised hand indication for the particular participant; and (iii) a textual alert message.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device within an operating environment, and more particularly communication device 100 within which several of the features of the present disclosure are advantageously implemented. Communication device 100 is managed by controller 101, which is communicatively coupled to image capturing device 102 and to at least one user interface device 103 that includes at least one microphone 104. Controller 101 is also communicatively coupled to at least one display device 110, which is an example user interface device 103. Controller 101 executes video conference application 105 stored in device memory 106 to configure communication device 100 to enable communication between participants in a video communication session and autonomously provide notification(s) when a remote participant attempts to speak without manually unmuting a microphone of a respective second electronic device 107a/107b for the remote participant. It is appreciated that the second electronic device can be similarly configured and/or provide similar functionality as communication device 100. According to one or more embodiments, controller 101 monitors, during a communication session with one or more second communication devices 107a-107b, an image stream received from one or more second communication devices 107a-107b for specific movements and/or gestures by a remote participant in the communication session using image recognition engine 109. As an example, image recognition engine 109 can be a neural net that is trained to recognize anatomical features including facial features and hand movements. As another example, image recognition engine 109 can have library objects 111 of objects that are used to compare to images. As an additional example, image recognition engine 109 can perform a two-dimensional correlation with library objects 111. In response to controller 101 identifying at least one of a speaking movement of a mouth of the local participant or a gesture by the local participant that is associated with the remote participant attempting to speak, while the remote participant's device is muted, controller 101 autonomously generates and presents an alert on user interface 108 that the remote participant is attempting to speak.

Each of communication device 100 and second communication devices 107a-107b can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring to the specific component makeup and the associated functionality of communication device 100 of FIG. 1. In one or more embodiments, communication device 100 has device memory 106, communication subsystem 112, data storage subsystem 113, and input/output (I/O) subsystem 114. Device memory 106 and each subsystem (112, 113, and 114) are managed by controller 101. Device memory 106 includes program code for applications, such as video conference application 105, and other application(s) 117. Device memory 106 further includes operating system (OS) 118, firmware interface 119, such as basic input/output system (BIOS) or Uniform Extensible Firmware Interface (UEFI), and firmware 120. Device memory 106 includes pre-identified movement data 122 and other computer data 123 used by video conference application 105.

Controller 101 includes processor subsystem 124 that executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of video conference application 105 and other applications 117 to configure communication device 100 to perform specific functions.

I/O subsystem 114 includes user interface components such as image capturing device 102, microphone 104, display device 110, touch/haptic controls 129, and audio output device(s) 131. I/O subsystem 114 also includes I/O controller 132. I/O controller 132 connects to internal devices 133, which are internal to housing 109, and to peripheral devices 134, such as external speakers, which are external to housing 109 of communication device 100. Internal devices 133 include computing, storage, communication, or sensing components depicted within housing 109. I/O controller 132 supports the necessary configuration of connectors, electrical power, communication protocols, and data buffering to act as an interface between internal devices 133 and peripheral devices 134 and other components of communication device 100 that use a different configuration for inputs and outputs.

Communication sub system 112 of communication device 100 enables wireless communication with external communication system 135. Communication sub system 112 includes antenna subsystem 136 having lower band antennas 137a-137m and higher band antenna arrays 138a-138n that can be attached in/at different portions of housing 109. Communication subsystem 112 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication sub system 112 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 to electromagnetically isolate a particular antenna.

In one or more embodiments, controller 101, via communication subsystem 112, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cellular "cells", base nodes, or base stations 154 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 137a-137m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 150 can be access node(s) 155 that support wireless OTA communication. Communication subsystem 112 can receive OTA communication from location services such as provided by global positioning system (GPS) satellites 156. Communication subsystem 112 communicates via OTA communication channel(s) 158a with base stations 154. Communication subsystem 112 communicates via wireless communication channel(s) 158b with access node 155. In one or more particular embodiments, access node 155 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 112 communicates with one or more locally networked devices 159 via wired or wireless link 158c provided by access node 155. Communication subsystem 112 receives downlink broadcast channel(s) 158d from GPS satellites 156 to obtain geospatial location information.

In one or more embodiments, controller 101, via communication subsystem 112, performs multiple types of OTA communication with local communication system 160. In one or more embodiments, local communication system 160 includes wireless headset 161 and smart watch 162 that are coupled to communication device 100 to form a personal access network (PAN). Communication subsystem 112 communicates via low power wireless communication channel(s) 158e with headset 161. Communication subsystem 112 communicates via second low power wireless communication channel(s) 158f, such as Bluetooth, with smart watch 162. In one or more particular embodiments, communication subsystem 112 communicates with second communication device(s) 107a via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. For example, data storage subsystem 113 can provide a selection of applications such as video conference application 105 and other application(s) 117 that use communication services. These applications can be loaded into device memory 106 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as code for video conference application 105 and other applications 117. When executed by controller 101, the program code causes or configures communication device 100 to provide the user interface functionality for video communication sessions described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. In one or embodiments that are not depicted, controller 101 can further include distributed processing and control components that are peripheral to or remote from housing 109 or grouped with other components, such as I/O subsystem 114. Data processor 172 is communicatively coupled, via system interlink 167, to device memory 106. In one or more embodiments, controller 101 of communication device 100 is communicatively coupled via system interlink 167 to communication subsystem 112, data storage subsystem 113, and I/O subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

In one or more embodiments, I/O subsystem 114 includes network interface controller (NIC) 175 with a network connection (NC) 176 on housing 109. Network cable 177 connects NC 176 to wired area network 178. Wired area network 178 can be a local area network (LAN), a campus area network (CAN), a metropolitan area network (MAN), or a wide area network (WAN). For example, NC 176 can be an Ethernet connection. Second communication devices 107b is presented communicatively couple to wired area network 178.

Figure 2A:
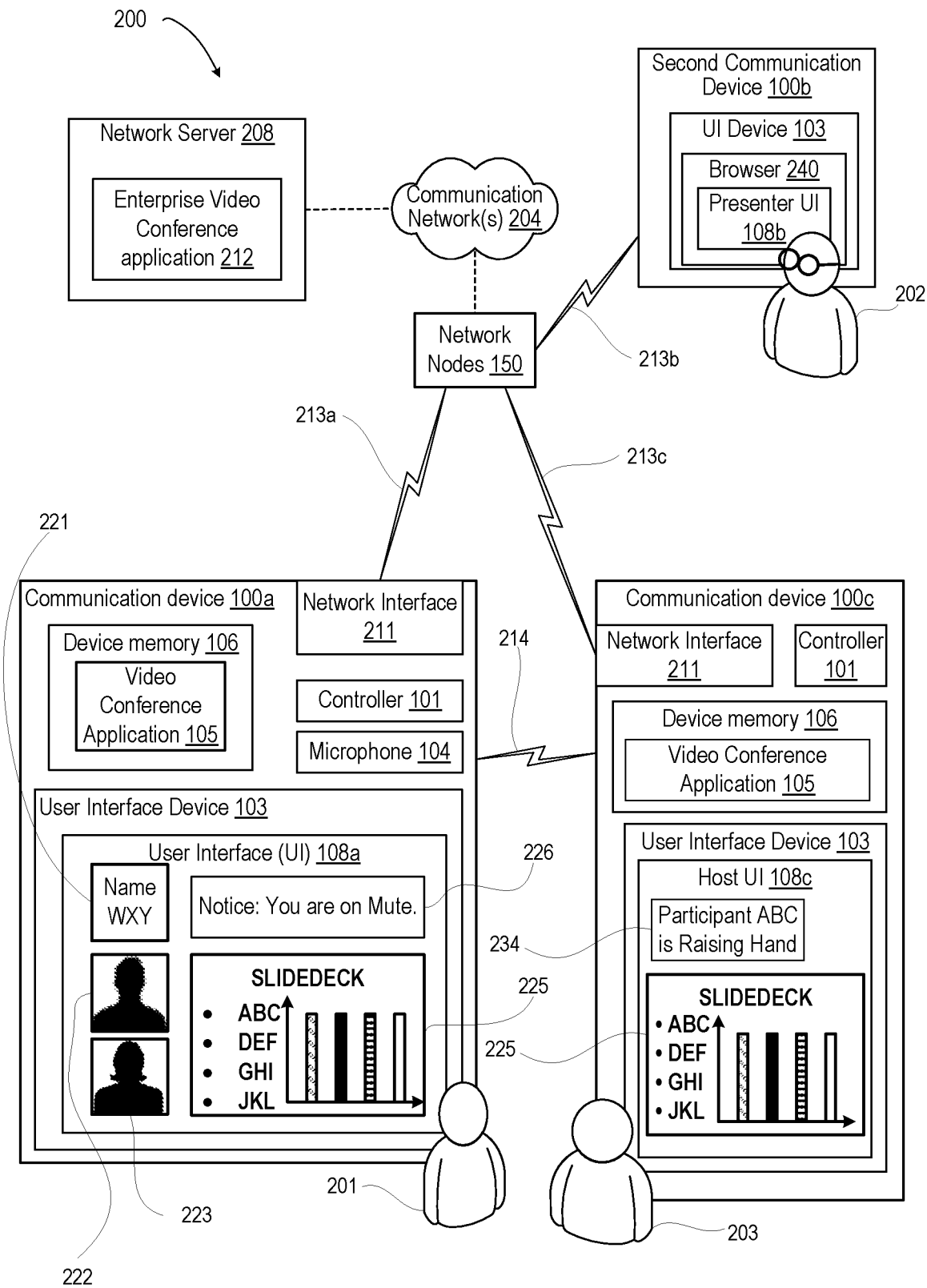
FIG. 2A depicts a functional block diagram of a communication system that supports a video communication session between two or more communication devices, according to one or more embodiments.

FIG. 2A depicts a functional block diagram of communication system 200 that supports a video communication session between first communication device 100a used by non-presenting participant 201, second communication device 100b used by presenter participant 202, and third communication device 100c used by host participant 203. First, second, and third communication devices 100a-100c are communicatively coupled via network 204 during a video communication session. In one or more embodiments, network server 208 executes enterprise video conference application 105 that facilitates setup of video conference sessions. In one or more embodiments enterprise video conference application 105 provides an interface between communication networks 151. Communication devices 100a-100c, managed by respective controllers 101, connect via local network interfaces 211, to network nodes 150 via over-the-air communication channels 213a-213c. In one or more embodiments, communication devices 100a, 100c can connect via ad hoc network connection 214. Communication devices 100a, 100c each execute video conference application 105 stored in respective device memory 106 to present user interfaces 108a, 108c on respective display devices 110. Communication device 100b includes browser 240 that downloads presenter UI 108b to display locally on display device 110b.

Communication device 100a presents user interface 108a for non-presenting participant 201 to interact with. Non-presenting participant 201 is not presenting and is not acting as host. Video conference application 105 customizes user interface 108a for non-presenting participant 201. User interface 108a receives image streams 221-223 from respective image capturing devices 102 of each communication device 100a-100c. In the presented embodiment, image stream 221 includes merely the name of non-presenting participant 201 who has turned off video sharing or whose communication device 100a does not have a working image capturing device 102. User interface 108a includes screen sharing window 225 and alert 226 that indicates that microphone 104 is muted. By monitoring the image stream, video conference application 105 detects an attempt by non-presenting participant 201 to actively participate in the video communication session by speaking.

Host participant 203 interacts with host user interface 108c that can be customized for a participant that has greater control over the video communication session. User interface 108c includes screen sharing window 225 that could be controlled by any of communication device 100a, communication device 100b or communication device 100c. Alert window 234 can provide indications of participants that are attempting to speak, allowing communication device 100c to assist communication device 100b by having host presenter 203 inform participants desiring to speak that they are muted.

Figure 2B:
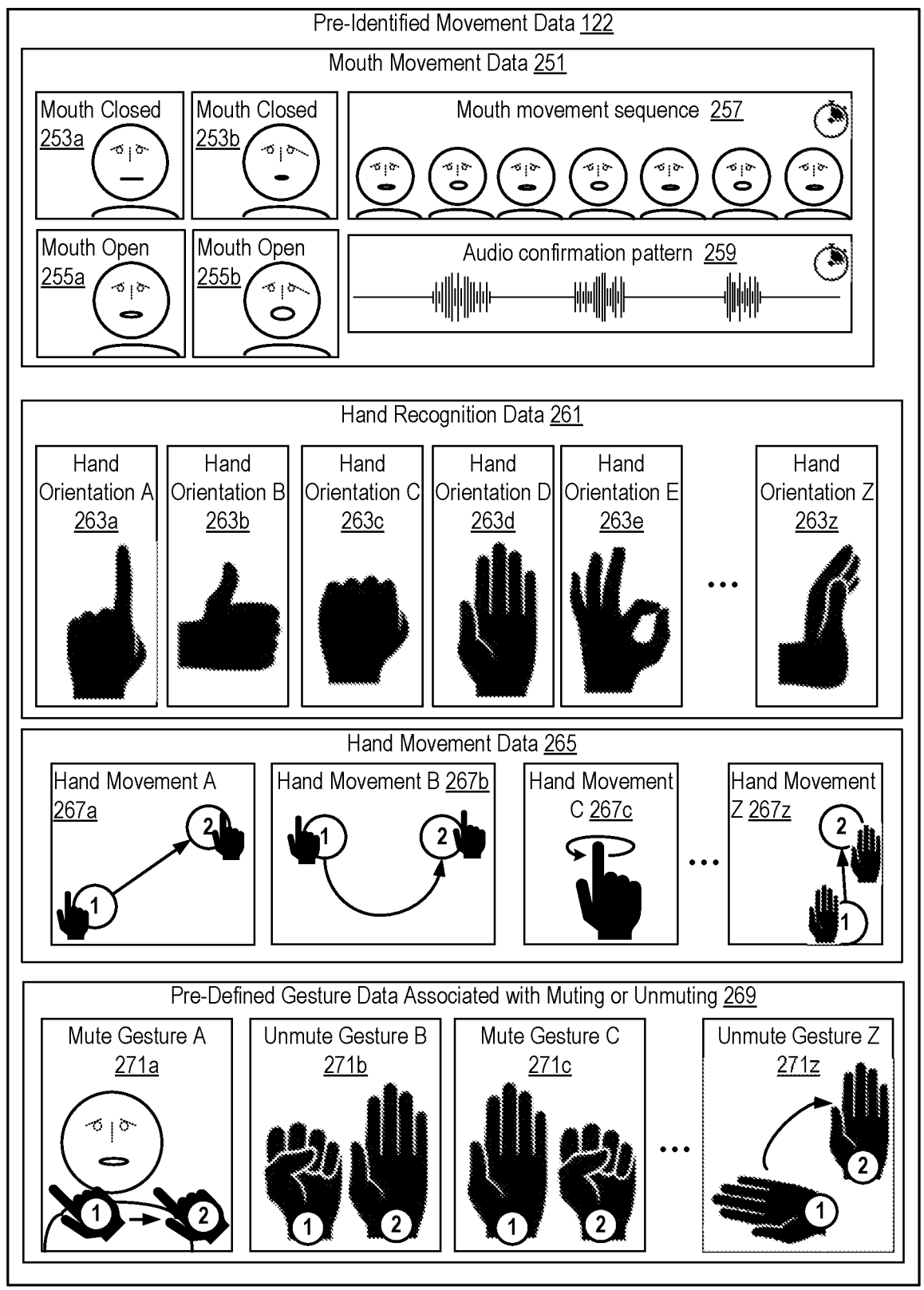
FIG. 2B depicts a diagram of pre-defined movement data stored in memory of the communication device of FIG. 1, according to one or more embodiments.

FIG. 2B depicts a diagram of example pre-defined movement data 122 stored in device memory 106 of presenter communication device 100b (FIG. 2A). In an example, pre-defined movement data 122 can include mouth movement data 251. Mouth movement data 251 can include first and second mouth closed recognition images 253a-253b that depicts a closed mouth that can be compared to an image live stream. Pre-defined movement data 122 can include first and second mouth open recognition images 255a-255b that depicts an opened mouth that can be compared to the image live stream. Mouth movement sequence 257 defines a minimum number of opening and closing of the mouth during a defined time period that indicates speaking. In one or more embodiments, audio confirmation pattern 259, if available, can be matched to the mouth movement sequence 257 to confirm an attempt to speak by non-presenting participant 201 (FIG. 2A).

Pre-defined movement data 122 can include hand recognition data 261 that can be compared to the image stream to recognize that one or both hands of non-presenting participant 201 are visible within the image stream. In an example, hand orientation A 263a depicts an index finger extended from a left hand. Hand orientation B 263b depicts only a thumb extended from a right hand. Hand orientation C 263c depicts a clenched left fist. Hand orientation D 263d depicts an open left hand. Hand orientation E 263e depicts only left hand making an "OK". Hand orientation B 263b depicts only a thumb extended from a right hand. Hand orientation Z 263z depicts only thumb-side view of an open left hand.

Pre-defined movement data 122 can include hand movement data 265 that can be compared to the image stream to recognize directional movement(s) of one or both hands of non-presenting participant 201. In an example, hand movement A 267a depicts a hand moving diagonally upward and laterally. Hand movement B 267b depicts a hand moving laterally in a U-shaped curve. Hand movement C 267c depicts an index finger making a twirling motion. Hand movement Z 267z depicts one hand moving upward.

Pre-defined movement data 122 can include pre-defined gesture data 269 that are associated with automatic muting, automatic unmuting, or toggling between muting and unmuting. In an example, mute gesture A 271a describes a slashing motion of an index finger in front of a neck of non-presenting participant 201 (FIG. 2A). Unmute gesture B 271b describes a clenched first unclenching to an open hand. Mute gesture C 271c describes an open hand clenching to a fist. Unmute gesture 271z describes palm out open hand swept in a 90° arc.

Pre-defined movement data 122 can further include rule-based filtering of gesturing. As an example, a gesture that last less than a first threshold period of time, such as two (2) seconds, can be ignored as not being associated with an attempt to speak. As another example, an open hand positioned over the mouth, such as in response to a yawn or a sneeze, can be ignored as not being associated with an attempt to speak. As an additional example, a finger scratching a portion of the face can be ignored as not being associated with an attempt to speak. As a further example, holding up a hand for more than a second threshold of time, such as seven (7) seconds, can be associated with an attempt to speak.

Figure 3A:
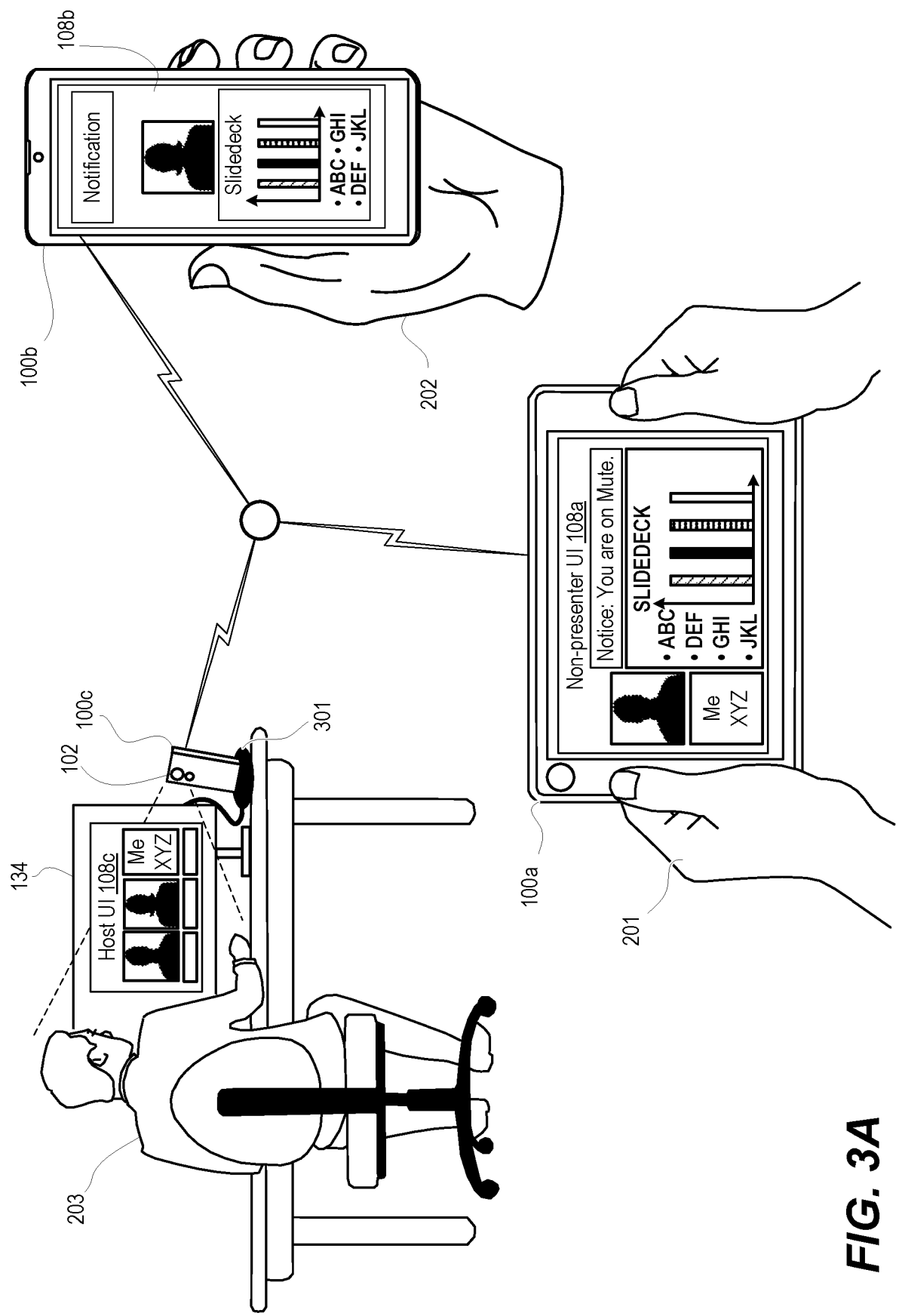
FIG. 3A depicts a front view of three communication devices each presenting a user interface for a video communication session, according to one or more embodiments.

FIG. 3A depicts a front view of three communication devices 100a-100c presenting user interfaces 108a-108c respectively tailored to a current role being played by non-presenting participant 201, presenting participant 202, and host participant 203 for a video communication session. Each of communication devices 100a-100c can be of different types, having some or all of the components of communication device 100 (FIG. 1) in different form factors. Alternatively, two or more of communication devices 100a-100c could be similar devices. In the presented example, communication device 100a is a tablet. In one or more embodiments, communication device 100b is a smart phone. Communication device 100b can be a mobile communication device, such as a smart phone, that includes user interface device 103 that presents presenter UI 108b. Communication device 100c can be a mobile communication device, such as a smart phone, placed in dock 301, which is communicatively coupled to a peripheral device 134 (FIG. 1). In one or more embodiments, peripheral device 134 is a monitor of desktop workstation.

With reference to FIG. 2A, communication system 200 includes pre-defined gestures database 250, such as maintained and distributed by network server 208. Participants 201, 203 can create custom gestures and custom spoken words that are used by respective communication devices 100a-100c. In an example, each gesture includes at least two relative positions of the hand. In another example, a gesture can be a recognizable position of the hand, such as pointing upward with the index finger. As an additional example, the gesture can be an exaggerated speaking of "hello" that can be lip read by communication devices 100a-100c.

Figure 3B:
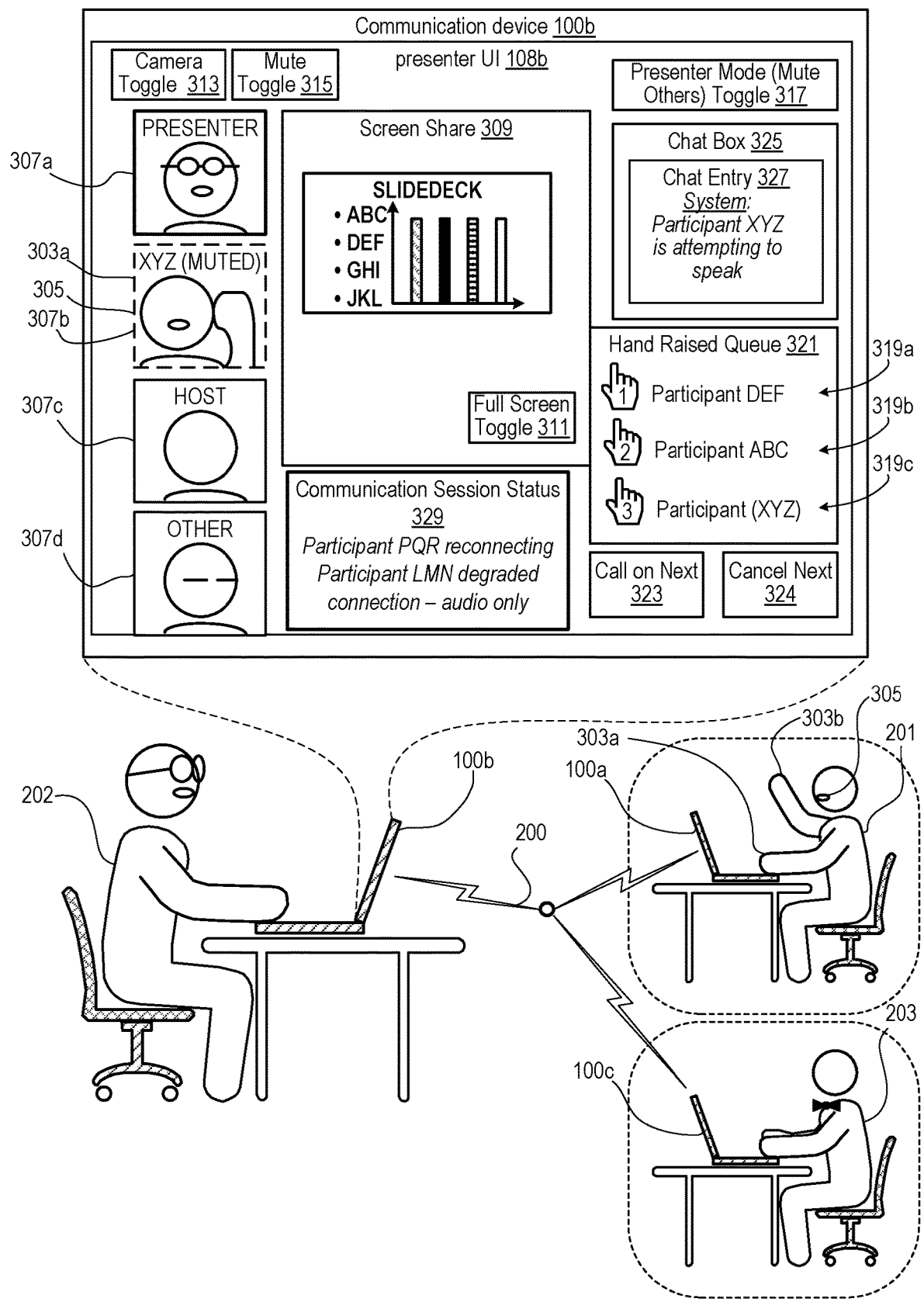
FIG. 3B depicts features of a presenter user interface provided on a display of one of the three communication devices of FIG. 3A, according to one or more embodiments.

FIG. 3B depicts a presenter user interface 108b presented on communication device 100b and used by presenting participant 202 during the video communication session. Communication system 200 communicatively couples communication device 100a used by non-presenting participant 201 and communication device 100c used by host participant 203 to communication device 100b. In one or more embodiments, an electronic device that is remote to communication device 100b and used by non-presenting participant 201 visually monitors movements by non-presenting participant 201 that indicate an attempt or desire by non-presenting participant 201 to speak to other participants (202-203) in video communication session. In an example, the electronic device that receives and monitors an image stream from communication device 100a can be network server 210 (FIG. 2A), communication device 100b, communication device 100c, or another electronic device that autonomously operates in support of the communication session. In an example, two or more electronic devices distribute the functions of receiving and monitoring of image streams from remote communication devices 100a and 100c. The determination that non-presenting participant 201 is attempting to speak is based on movements of one or more hands 303a-303b or based on movement of mouth 305 of non-presenting participant 201. An electronic device, such as communication device 100b, that identifies the movements within the received video stream from communication device 100b can send an alert to one or more of communication devices 100a, 100c. For clarity, the present disclosure includes transmitting the alert to or generating the alert on communication devices 100b to alert the presenting participant 202 that another participant is desirous of or attempting to speak. The presenting participant 202 can be alerted in one or more ways, which can unobtrusively prompt a decision to allow or ignore the attempt to speak by non-presenting participant 201. The presented alerts seek to inform the presenter without degrading the user experience in participating in the communication session.

In one or more embodiments, presenter user interface 108b can present local image stream as video inset box 307a and can present one or more received and monitored remote images streams as video inset boxes 307b-307d. In one or more embodiments, the number of participants can exceed available display locations to present all remote image streams. Audio inputs received from the respective remote image streams can automatically prioritize particular video inset boxes to display within the visible portion of presenter user interface 108b. According to aspects of the present disclosure, movement of hands 303a-303b or mouth 305 by non-presenting participant 201 can prioritize presentation of video inset box 307b for non-presenting participant 201 even though non-presenting participant 201 is locally hard muted and is not providing audio input to the other communication devices 100b-100c. According to one or more embodiments, controller of communication device 100b utilizes on-screen movement of video inset box 307b to serve as an alert to presenting participant 102. In an example, presenting participant 102 can select full screen toggle button 311 to activate a display mode where screen share box 309 takes up the full screen. Controller of communication device 100b responds to identification or detection of an attempt by non-presenting participant 201 to speak by automatically resizing screen share box 309 or positioning video inset box 307b on top of screen share box 309 (e.g., in a bottom corner or top of the screen, away from the main content).

Presenting user interface 108b includes camera toggle button 313 to locally turn off image capturing device 102 (FIG. 1) of communication device 100b. Presenting user interface 108b includes mute button 315 to locally turn off microphone 104 (FIG. 1) of communication device 100b. Presenting user interface 108b can also include presenter mode (i.e., mute others) toggle button 317 to "soft" mute other communication devices 100a and 100c to avoid interruptions during a presentation. In one or more embodiments, audio inputs from other communication devices 100a and 100c continues to be available to communication device 100b for corroborating (by controller operations in the background) whether non-presenting participant 201 is attempting to speak.

In one or more embodiments, user interface 108b can include alternate visual tools to communicate with other participants, such as enabling selections to "raise hand", which adds participant to hand raised indications 319a-319c within hand raised queue 321. User interfaces 108a and 108c (FIG. 3A) can similarly include alternate visual tools to communicate with other participants, such as enabling selections to "raise hand", which adds a respective one of hand raised indications 319a-319c corresponding to participant to hand raised queue 321. For example, call on next button 323 can automatically designate the next participant in the hand raised queue 321 to speak, such as by unmuting a soft mute status and alerting the designated participant. Presenting participant 202 can also select cancel next button 324 to clear one or more hand raised indications 319a-319c. Participants 201-203 can also use chat box 325 to send text messages to some or all of other participants 201-203. Automated alert of a detected attempt by non-presenting participant 201 to speak can be provided via chat box 325 as chat entry 327. In addition to detecting an inadvertent speaking while muted scenario, non-presenting participant 201 can also intentionally use the automatic visual detection as an intuitive and expeditious way to get the attention of presenting participant 202. Non-presenting participant 201 can make movements that will cause one or more alerts to be generated and presented.

In addition to alerting presenting participant 202 of a detected attempt by non-presenting participant 201 to speak, different types of alerts can be included in presenter user interface 108b such as detecting when communication is interrupted to one or more other participants 201 and 203. Communication session status box 329, for example, can alert presenting participant 202 when speaking should be paused until particular participants are able to communicate.

Figure 4A:
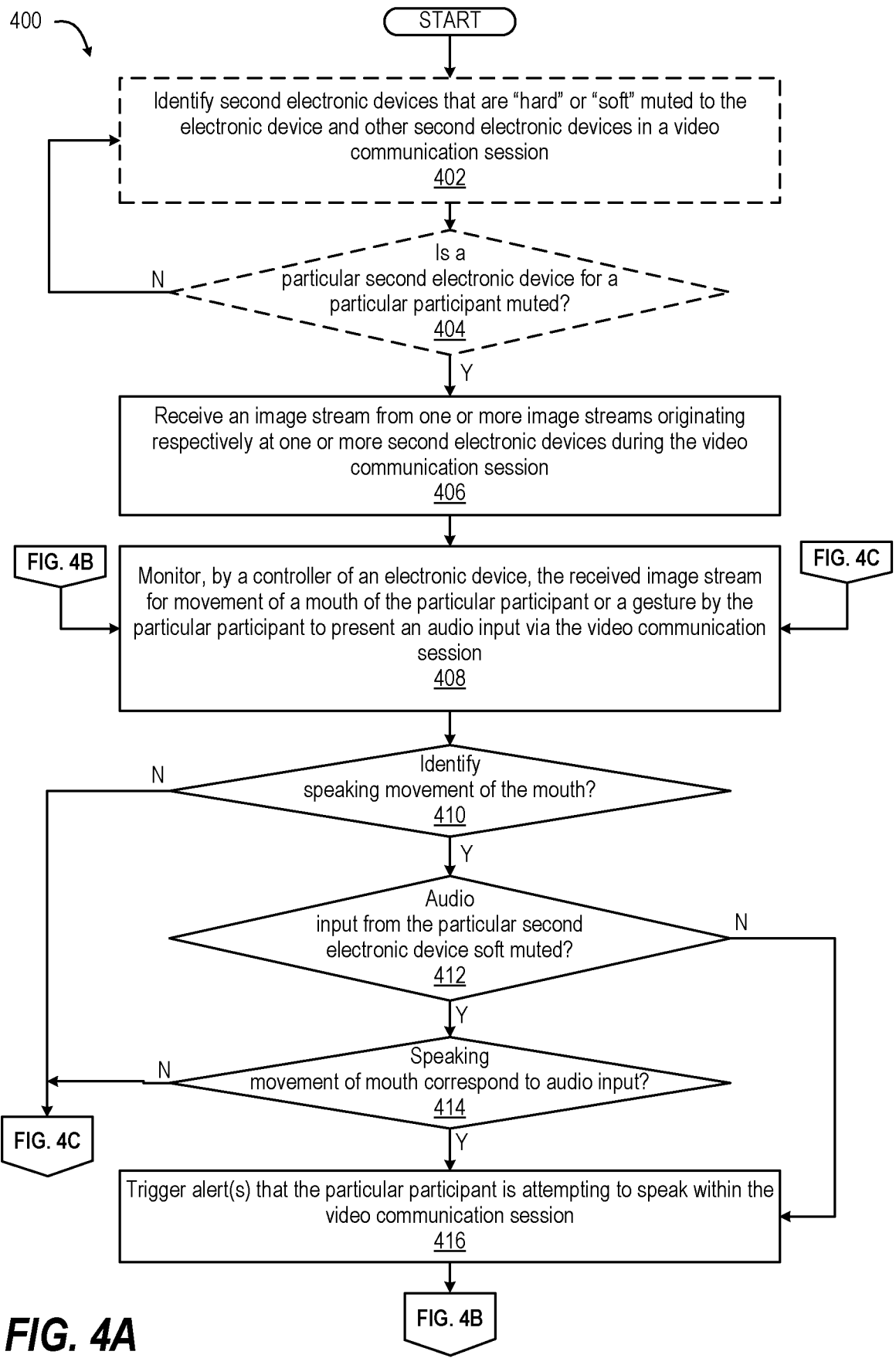
FIGS. 4A-4C (FIG. 4) present a flow diagram of a method for reducing loss of communication between participants in a communication session when a remote participant attempts to speak without manually unmuting the electronic device, according to one or more embodiments.
Figure 4B:
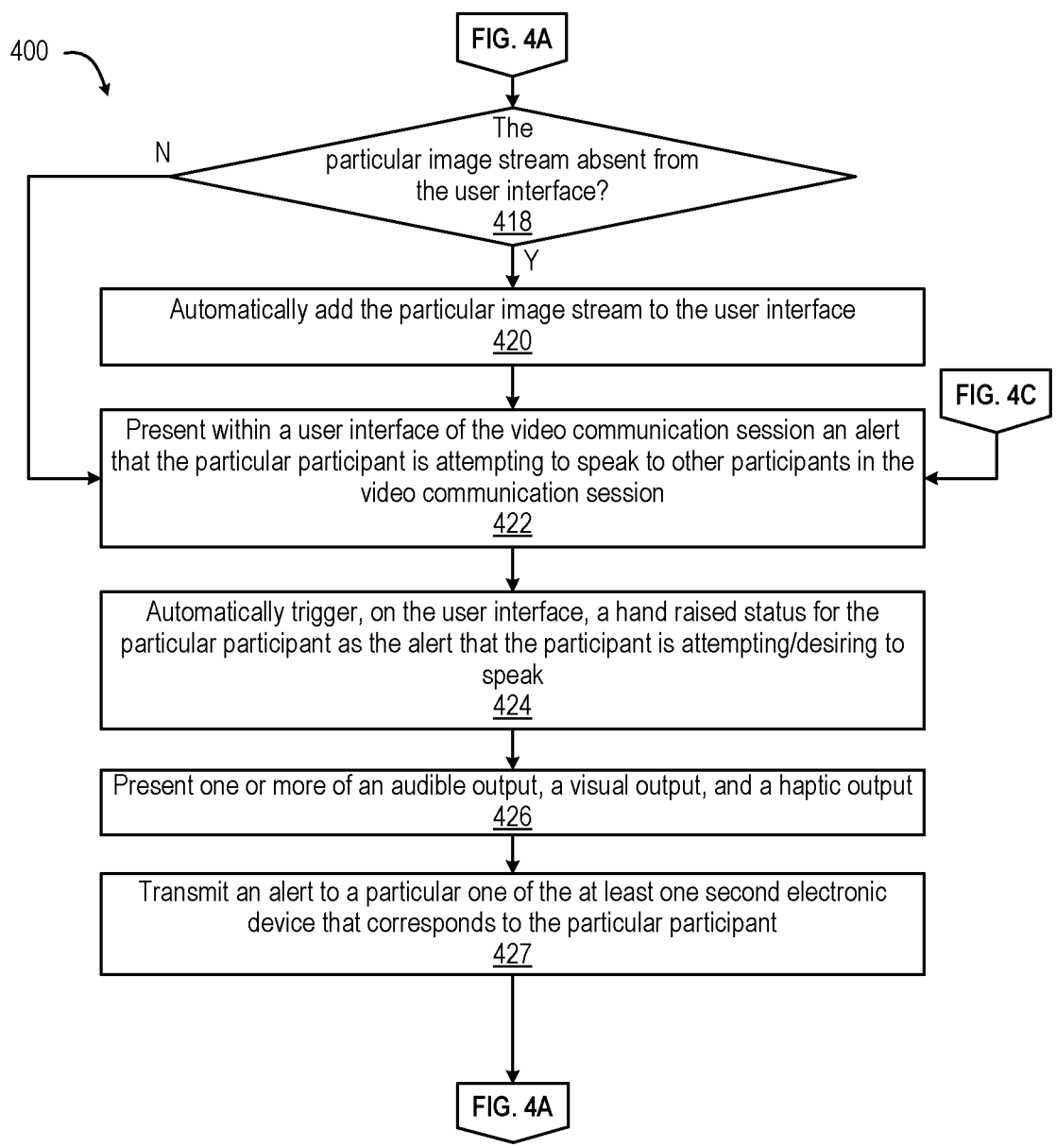
Figure 4C:
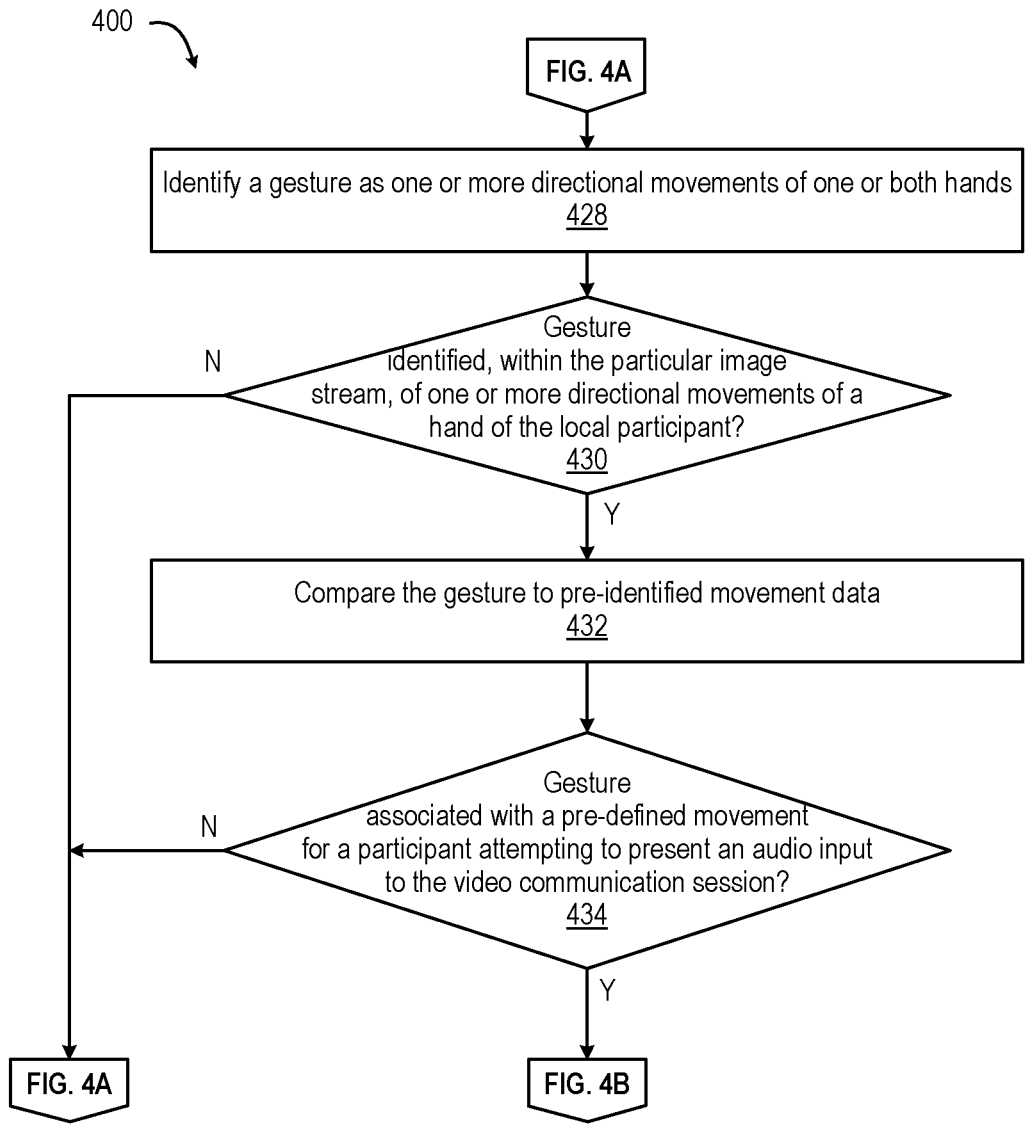

FIGS. 4A-4C (FIG. 4) present a flow diagram of a method for reducing loss of communication between participants in a communication session when a remote participant attempts to speak without manually unmuting the electronic device, such as communication device 100 (FIG. 1). In at least one embodiment, communication device 100, managed by controller 101, executes video conference application 105 (FIG. 1) to facilitate the communication session. In one or more embodiments, video conference application 105 (FIG. 1) is implemented in browser 240 (FIG. 2A), where browser 240 is executed by controller 101. In one or more embodiments, the electronic device is presenting communication device 100b used by presenting participant 202 (FIG. 3B). In one or more embodiments, the electronic device is host communication device 100c used by host participant 203 (FIG. 3B). Some functionality of the communication session can be executed by network server 208 (FIG. 2A). The description of method 400 is provided with general reference to the specific components illustrated within the preceding FIGS. 1, 2A-2B and 3A-3B, and specific components referenced in method 400 can be identical or similar to components of the same name used in describing preceding FIGS. 1, 2A-2B and 3A-3B. With reference to FIG. 4A, method 400 includes identifying second electronic devices that are "hard" or "soft" muted to the electronic device and other second electronic devices (block 402). Hard muting, when implemented at particular second electronic device, prevents transmission of audio input by the corresponding remote participant to the electronic device and the other second electronic devices. Soft muting is implemented by the electronic device, another second electronic device, or a network server to prevent the audio input transmitted by the soft-muted second electronic device from being presented as audio output within the video communication session of the electronic device and the second electronic devices. The soft-muted second electronic device would otherwise transmit audio that is heard by the other participants of the video communication session. In one or more embodiments, method 400 includes determining whether a particular second electronic device used by a particular participant is muted (decision block 404). In one or more embodiments, the particular second electronic device is non-presenting communication device 100a that is used by non-presenting participant (FIG. 3B). In one or more embodiments, the particular second electronic device indicates or reports to the electronic device and the other second electronic devices that the particular second electronic device is hard muted. In one or more embodiments, the electronic device infers that the second electronic device is hard muted based on receiving a null audio input via an audio channel that is transmitted by the particular second electronic device. The lack of even a small amount of noise can indicate that no audio input is being received even though the connection is open. In one or more embodiments, the electronic device receives an indication from another second electronic device that the particular second electronic device has been soft muted. In response to determining that no particular second electronic device is soft muted, method 400 returns to block 402. In response to determining that the particular second electronic device is muted, method 400 includes receiving an image stream from one or more image streams originating respectively at one or more second electronic devices during the video communication session (block 406). In one or more embodiments, method 600 monitors for visual movements by non-presenting participants who are speaking but unheard due to being muted as well as by non-presenting participants who knowingly are making movement to indicate a desire to speak to the video communication session. In particular, visual movement monitoring can be used to detect a non-presenting presenter who is making gestures or mouth movements to get the attention of the presenting participant without interrupting the audio output to the video communication session. Relying upon the automatic movement detection, the non-presenting participant need not manually trigger a user interface control to provide a "raise hand" indication or to type out a direct message. Thus, blocks 402 and 404 may not performed and method 400 can begin at block 406. Method 400 includes monitoring, by the controller of the electronic device, the received image stream for movement of a mouth of the particular participant or a gesture by the particular participant to present an audio input to the video communication session (block 408). Method 400 includes determining whether a speaking movement of the mouth of the particular participant is identified in the particular image stream (decision block 410). In response to determining that a speaking movement of the mouth of the particular participant is identified within the particular image stream, method 400 includes determining whether an audio input from the particular second electronic device for the particular participant is soft muted (decision block 412). The availability of the audio input to the controller of the electronic device can be used for confirmation of a visually recognized attempt to speak. If the particular second electronic device is hard muted, then the audio input is not available. As previously mentioned, hard muting can be reported by the particular second electronic device or can be inferred from a null audio input. If the particular second electronic device is neither hard nor soft muted, then the audio input from the particular participant would be presented by the electronic device to the presenting participant and others participating within the video conference. In response to determining that the audio input is soft muted from the particular second electronic device, method 400 includes determining whether the speaking movement of the mouth corresponds to audible sounds received within the particular audio stream (decision block 414). In an example, a non-presenting participant could make a movement of the mouth, such as chewing or yawning, that is not part of speaking. The soft-muted audio input, if available, can confirm whether or not the non-presenting participant is actually speaking. Similarly, the non-presenting participant could be visually registering their disagreement or agreement with what the presenter is saying by saying something "under their breath" that is not loud enough to be deemed talking. In response to either (i) determining that the speaking movement of the mouth corresponds to audible sounds of participant speech within the particular audio stream in decision block 414 or (ii) determining that soft muting is not activated and thus no audio input is received with the respective image stream in decision block 412, method 400 includes triggering one or more alert(s) that the particular participant is attempting to speak within the video communication session (block 416).

With reference to FIG. 4B, in one or more embodiments, method 400 includes determining whether the particular image stream is absent from the user interface (decision block 418). In response to determining that the particular image stream is absent from the user interface, method 400 includes automatically adding the particular image stream to the user interface (block 420). In response to determining that the particular image stream is not absent from the user interface in decision block 418 or after block 420, in one or more embodiments, method 400 includes presenting within a user interface of the video communication session an alert that the particular participant is attempting to speak to other participants in the video communication session (block 422). In one or more embodiments, the alert can be alphanumeric. In one or more embodiments, the alert can be visually subdued, so as to avoid interrupting the presenting participant in the middle of speaking. In one or more embodiments, the alert can be accentuated with contrasting, flashing, or brighter colors or of a large size to gain the attention of the presenting participant. In one or more embodiments, the alert can be delayed until the presenting participant pauses in speaking. In one or more embodiments, method 400 includes automatically triggering, on the user interface, a hand raised status for the particular participant as the alert that the participant is attempting/desiring to speak (block 424). In one or more embodiments, method 400 includes presenting one or more of an audible output, a visual output, and a haptic output via the at least one user interface device as a notification to the presenting participant (block 426). For example, to avoid an audio interruption to the communication session, a vibration alert could be provided to the presenting participant. In one or more embodiments, method 400 includes transmitting an alert to a particular one of the at least one second electronic device that corresponds to the particular participant (block 426). As an example, the shared screen video could be customized for the particular participant to include a pop-up, flashing text box that reads "Your device is muted" or "Your device is muted by the presenter." As another example, the chat room functionality of the video communication session could be used to send an instant message just to the particular second electronic device. Then method 400 returns to block 402 (FIG. 4A).

Returning briefly to FIG. 4A, in response to not identifying any speaking movement of the mouth within the particular image stream in decision block 410 or determining that the speaking movement of the mouth does not correspond to audible sounds in decision block 414, method 400 proceeds to decision block 428 of FIG. 4C. In one or more embodiments, method 400 can visually detect gesturing as an attempt or desire to talk due to several scenarios. First, the non-presenting participant can be a person disposed to "talking with their hands". Second, the non-presenting participant may gesture out of frustration in not being able to gain the attention of the presenting participant. Third, the non-presenting participant may be fully aware of specific gestures that are pre-defined to trigger automated responses by the electronic device. Method 400 includes identifying a gesture as one or more directional movements of one or both hands (block 428). At decision block 430, method 400 includes determining whether a gesture is identified, within the particular image stream, of one or more directional movements of a hand of the local participant. In response determining that a gesture is not identified, method 400 returns to block 408 (FIG. 4A). Very brief movements such as shifting a hand resting on a tabletop may not be deemed to be a gesture. In response to determining that a gesture is identified, method 400 includes comparing the gesture to pre-identified movement data 122 (FIG. 2B) (block 432). Method 400 includes determining whether the gesture is associated with a pre-defined movement for a participant attempting to present an audio input to the video communication session (decision block 434). In response determining that a gesture is not identified as the particular participant attempting to present an audio input to the video communication session, method 400 returns to block 408 (FIG. 4A). Gestures or rules defined in pre-identified movement data 122 (FIG. 2B) can filter out brief hand movements or movements that are not associated with speaking, such as to scratch the face or to cover a yawn. In response to determining that a gesture by the particular participant is identified as the particular participant wanting to present an audio input to the video communication session, method 400 returns to block 422 (FIG. 4B).

Figure 5:
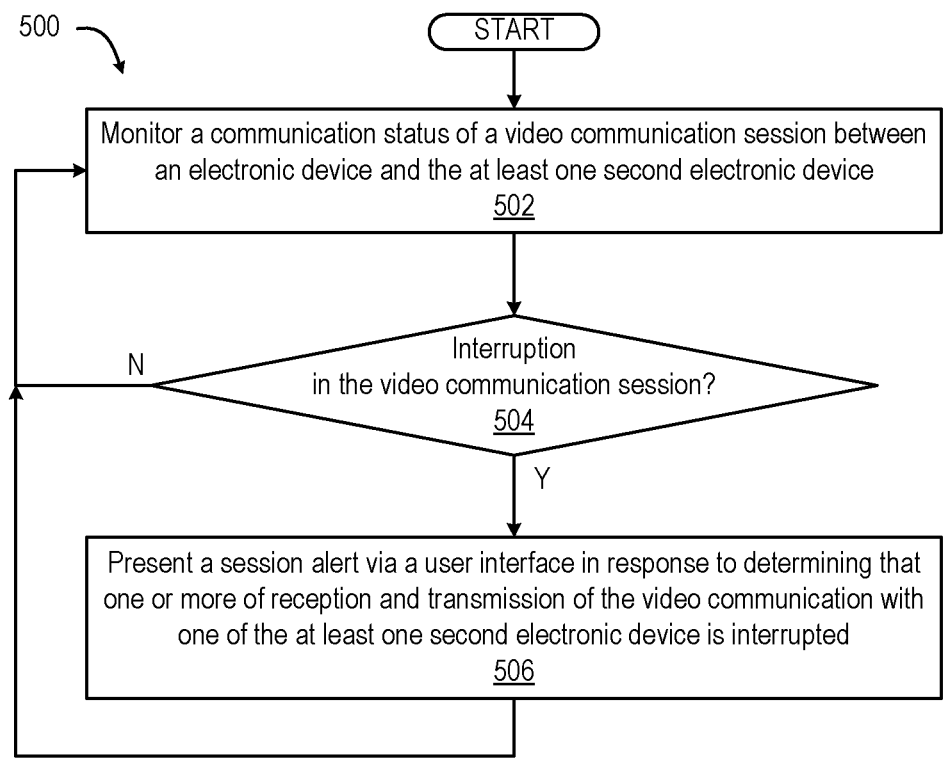
FIG. 5 presents a flow diagram of a method for alerting a presenter in a video communication session when an interruption is occurring in the video communication session, according to one or more embodiments.

FIG. 5 presents a flow diagram of method 500 for alerting a presenter in a video communication session when an interruption is occurring in the video communication session. In at least one embodiment, communication device 100, managed by controller 101, executes video conference application 105 (FIG. 1) to facilitate the communication session. In one or more embodiments, video conference application 105 (FIG. 1) is implemented in browser 240 (FIG. 2A), where browser 240 is executed by controller 101. Some functionality of the communication session can be executed by network server 208 (FIG. 2A). The description of method 500 is provided with general reference to the specific components illustrated within the preceding FIGS. 1, 2A-2B, 3A-3B, and 4A-4B and specific components referenced in method 500 can be identical or similar to components of the same name used in describing preceding FIGS. 1, 2A-2B, 3A-3B, and 4A-4C. In one or more embodiments, method 500 is performed concurrently with method 400 (FIGS. 4A-4C).

Method 500 includes monitoring a communication status of a video communication session between an electronic device and the at least one second electronic device (block 502). Method 500 includes determining whether an interruption has occurred in the video communication session (decision block 504). In response to determining whether an interruption has occurred in the video communication session, method 500 includes presenting a session alert via a user interface in response to determining that one or more of reception and transmission of the video communication with one of the at least one second electronic device is interrupted (block 506). In response to determining that an interruption has not occurred in the video communication session or after block 506, method 500 returns to block 502.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one display device that locally presents at least one user interface associated with a video communication session;
   a network interface device that enables the electronic device to communicatively communicate in a video communication session with at least one second electronic device and which receives one or more image streams originating respectively at the at least one second electronic devices during the video communication session; and
   a controller communicatively coupled to the at least one display device and the network interface device, and which:
      receives and monitors the one or more image streams from the network interface device;
      identifies, in a particular image stream of the one or more image streams, at least one of a speaking movement of a mouth of a particular remote participant or a gesture by the particular remote participant to present an audio input to the video communication session;
      in response to identifying the speaking movement, confirms that the particular participant, who is a non-presenting participant, is actually speaking by determining that the speaking movement of the mouth corresponds to audible participant speech within a particular audio stream received from a soft-muted microphone;
      presents, within one or more of the at least one user interface and a particular one of the at least one second electronic devices that corresponds to the particular remote participant, an alert that the particular remote participant is attempting to speak to other participants in the video communication session; and
      in response to the particular image stream being absent from the user interface and a screen share box being presented on a full screen, presents the alert that the particular participant is attempting to speak at least in part by automatically adding the particular image stream to the user interface by automatically resizing a screen share box or positioning a video inset box on top of the screen share box.

2. The electronic device of claim 1, wherein the controller presents the alert that the particular participant is attempting to speak by automatically triggering, on the user interface, a hand raising alert associated with the particular participant.

3. The electronic device of claim 1, wherein the controller:
   receives a particular audio stream associated with the particular image stream while an associated second device of the particular participant is soft-muted;
   prevents the particular audio stream from being presented by the electronic device and the at least one second electronic device;
   identifies in the particular image stream the speaking movement of the mouth of the particular participant; and
   presents the alert via the user interface that the particular participant is attempting to speak further in response to determining that the speaking movement of the mouth corresponds to audible participant speech within the particular audio stream.

4. The electronic device of claim 1, wherein, to identify, in the particular image stream of the one or more image streams, the gesture by the particular participant to present the audio input, the controller:
   tracks directional movement of a hand of the particular participant within the particular image stream, while a microphone of an electronic device of the particular participant is muted;
   identifies an unmute gesture based on one or more sequential directional movements of the hand of the particular participant corresponding to a pre-defined movement; and
   associates the unmute gesture with the particular participant attempting to present audio input by utilizing at least one of (i) a neural net that is trained to recognize anatomical features including facial features and hand movements and (ii) a library of objects used to compare to received images.

5. The electronic device of claim 1, wherein the controller presents the alert that the particular participant is attempting to speak as one or more of an audible output, a visual output, and a haptic output.

6. The electronic device of claim 1, wherein the controller:
- detects, from the one or more image streams, that multiple participants are speaking at or around a same time;
- creates and regulates an order in which the multiple participants will speak within the video communication session; and
- provides a notification associated with the order in the multiple participants are permitted to speak.

7. The electronic device of claim 6, wherein:
- to create and regulate the order the controller adds hand raised indications for each of the multiple participants to a hand raised queue; and
- the controller automatically designates a next participant in the hand raise queue to speak by unmuting a soft mute status associated with the next participant and transmitting an alert to the next participant.

8. A method comprising:
- receiving and monitoring, by a controller of an electronic device, one or more image streams originating respectively at one or more second electronic devices during a video communication session;
- identifying, in a particular image stream of the one or more image streams, at least one of a speaking movement of a mouth of a particular remote participant or a gesture by the particular remote participant to present an audio input via the video communication session;
- in response to identifying the speaking movement, confirming that the particular participant, who is a non-presenting participant, is actually speaking by determining that the speaking movement of the mouth corresponds to audible participant speech within a particular audio stream received from a soft-muted microphone;
- presenting within a user interface of the video communication session that comprises an alert that the particular remote participant is attempting to speak to other participants in the video communication session; and
- in response to the particular image stream being absent from the user interface and a screen share box being presented on a full screen, presents the alert that the particular participant is attempting to speak at least in part by automatically adding the particular image stream to the user interface by automatically resizing a screen share box or positioning a video inset box on top of the screen share box.

9. The method of claim 8, wherein presenting the alert that the particular participant is attempting to speak comprises at least one of: automatically triggering, or on the user interface, a hand raising alert for the particular participant; and automatically adding the particular image stream to the user interface in response to the particular image stream being absent from the user interface.

10. The method of claim 8, further comprising:
- receiving a particular audio stream associated with the particular image stream, while the associated second device of the particular participant is soft-muted;
- preventing the particular audio stream from being presented by the electronic device and the at least one second electronic device;
- identifying in the particular image stream the speaking movement of the mouth of the particular participant; and
- presenting the alert via the user interface that the particular participant is attempting to speak further in response to determining that the speaking movement of the mouth corresponds to participant speech within the particular audio stream.

11. The method of claim 8, wherein identifying, in the particular image stream of the one or more image streams, the gesture by the particular participant to present the audio input, comprises:
- tracking directional movement of a hand of the particular participant within the particular image stream, while a microphone of an electronic device of the particular participant is muted;
- identifying an unmute gesture based on one or more sequential directional movements of the hand of the particular participant corresponding to a pre-defined movement; and
- associating the unmute gesture with the particular participant attempting to present audio input by utilizing at least one of (i) a neural net that is trained to recognize anatomical features including facial features and hand movements and (ii) a library of objects used to compare to received images.

12. The method of claim 8, further comprising:
- detecting from the one or more image streams that multiple participants are speaking at or around a same time;
- creating and regulating an order in which the multiple participants will speak within the video communication session; and
- providing a notification associated with the order in the multiple participants are permitted to speak.

13. The method of claim 12, wherein:
- creating the order comprises adding each of the multiple participants to hand raised indications within a hand raised queue; and
- the method further comprises automatically designating a next participant in the hand raise queue to speak by unmuting a soft mute status associated with the next participant and transmitting an alert to the next participant.

14. A computer program product comprising:
- a computer readable storage device; and
- program code on the computer readable storage device that when executed by a processor associated with an electronic device, the program code enables the electronic device to provide the functionality of:
  - receiving and monitoring one or more image streams originating respectively at one or more second electronic devices during a video communication session;
  - identifying, in a particular image stream of the one or more image streams, at least one of a speaking movement of a mouth of a particular remote participant or a gesture by the particular remote participant to present an audio input via the video communication session;
  - in response to identifying the speaking movement, confirming that the particular participant, who is a non-presenting participant, is actually speaking by determining that the speaking movement of the mouth corresponds to audible participant speech within a particular audio stream received from a soft-muted microphone;
  - presenting within a user interface of the video communication session an alert that the particular remote participant is attempting to speak to other participants in the video communication session; and in response to the particular image stream being absent from the user interface and a screen share box being presented on a full screen, presenting the alert that the particular participant is attempting to speak at least in part by automatically adding the particular image stream to the user interface by automatically resizing a screen share box or positioning a video inset box on top of the screen share box.

15. The computer program product of claim 14, wherein the program code enables the electronic device to provide the functionality of presenting the alert that the particular participant is requesting to speak by at least one of: automatically triggering, or on the user interface, a hand raising alert for the particular participant; and in response to the particular image stream being absent from the user interface, automatically adding the particular image stream to the user interface.

16. The computer program product of claim 14, wherein the program code enables the electronic device to provide the functionality of:
receiving a particular audio stream associated with the particular image stream, while the associated second device of the particular participant is soft-muted;
preventing the particular audio stream from being presented by the electronic device and the at least one second electronic device;
identifying in the particular image stream the speaking movement of the mouth of the particular participant; and
presenting the alert via the user interface that the particular participant is attempting to speak further in response to determining that the speaking movement of the mouth corresponds to audible participant speech within the particular audio stream.

17. The computer program product of claim 14, wherein the program code enables the electronic device to provide the functionality of identifying, in the particular image stream of the one or more image streams, the gesture by the particular participant to present the audio input, by:
tracking directional movement of a hand of the particular participant within the particular image stream, while a microphone of an electronic device of the particular participant is muted;
identifying an unmute gesture based on one or more sequential directional movements of the hand of the particular participant corresponding to a pre-defined movement; and
associating the unmute gesture with the particular participant attempting to present audio input by utilizing at least one of (i) a neural net that is trained to recognize anatomical features including facial features and hand movements and (ii) a library of objects used to compare to received images.

18. The computer program product of claim 14, wherein the program code enables the electronic device to provide the functionality:
detecting from the one or more image streams that multiple participants are speaking at or around a same time;
creating and regulating an order in which the multiple participants will speak within the video communication session; and
providing a notification associated with the order in the multiple participants are permitted to speak.

19. The computer program product of claim 14, wherein:
the program code for creating the order comprises program code for adding each of the multiple participants to hand raised indications within a hand raised queue; and
the program code further comprises program code that enables the electronic device to provide the functionality of automatically designating a next participant in the hand raise queue to speak by unmuting a soft mute status associated with the next participant and transmitting an alert to the next participant.

* * * * *